(12) United States Patent
Bressler et al.

(10) Patent No.: US 7,121,754 B2
(45) Date of Patent: Oct. 17, 2006

(54) SHAVING APPARATUS WITH PIVOT-ACTUATED VALVE FOR DELIVERY OF SHAVING AID MATERIAL

(75) Inventors: Peter Bressler, Philadelphia, PA (US); David Schiff, Highland Park, NJ (US); Andrew Pennella, Stamford, CT (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 10/730,618

(22) Filed: Dec. 8, 2003

(65) Prior Publication Data

US 2005/0123342 A1   Jun. 9, 2005

(51) Int. Cl.
*A47L 13/30* (2006.01)
*B26B 19/44* (2006.01)
*A45D 27/28* (2006.01)

(52) U.S. Cl. .................... 401/264; 401/263; 30/41; 30/535

(58) Field of Classification Search ............... 401/190, 401/261, 263, 264, 265, 266; 30/32, 34.05, 30/41, 41.5, 538, 535; 222/402.1, 402.21, 222/402.22, 402.23, 402.24, 402.25
See application file for complete search history.

(56) References Cited

U.S. PATENT DOCUMENTS

| | | | | |
|---|---|---|---|---|
| 1,899,841 A | 2/1933 | Acken | ............................. | 30/41 |
| 3,053,422 A | 9/1962 | Tenison | ...................... | 222/399 |
| 3,417,468 A * | 12/1968 | Miyauchi | ........................ | 30/41 |
| 3,703,765 A | 11/1972 | Perez | ............................. | 30/41 |
| 3,726,009 A | 4/1973 | Hackmyer | ...................... | 30/41 |
| 3,749,291 A * | 7/1973 | Prussin et al. | ......... | 222/402.24 |
| 4,023,269 A | 5/1977 | Lopez, Jr. | ...................... | 30/41 |
| 4,077,119 A | 3/1978 | Sellera | ........................... | 30/41 |
| 4,177,556 A | 12/1979 | Galli, Jr. | ........................ | 30/41 |
| 4,377,034 A | 3/1983 | Druash et al. | ................. | 30/41 |
| 4,433,483 A | 2/1984 | Lazarus | .......................... | 30/41 |
| 4,562,643 A | 1/1986 | Cataudella | ..................... | 30/41 |
| 4,753,006 A | 6/1988 | Howe | ............................. | 30/41 |
| 4,760,642 A | 8/1988 | Kwak | ........................... | 30/123 |
| 4,791,723 A | 12/1988 | Jacobson | ........................ | 30/41 |
| 4,809,432 A | 3/1989 | Schauble | ........................ | 30/41 |
| 4,813,138 A | 3/1989 | Chen | ............................... | 30/41 |
| 4,868,982 A | 9/1989 | McComas | ....................... | 30/41 |
| 4,888,868 A | 12/1989 | Pritchard | ........................ | 30/41 |
| 4,908,945 A | 3/1990 | Jacobson | ........................ | 30/41 |
| 4,974,319 A | 12/1990 | Maguire, Jr. et al. | .......... | 30/41 |
| 5,014,427 A | 5/1991 | Byrne | ............................ | 30/41 |
| 5,016,351 A | 5/1991 | Drahus | ........................... | 30/41 |

(Continued)

FOREIGN PATENT DOCUMENTS

CH        653 595 A5     1/1986

(Continued)

OTHER PUBLICATIONS

Copy of PCT Search Report for Serial No. PCT/IB03/01144 dated Oct. 29, 2003.

*Primary Examiner*—David J. Walczak
(74) *Attorney, Agent, or Firm*—Michaud-Duffy Group LLP

(57) ABSTRACT

A shaving apparatus includes a reservoir for storing a shaving aid material, a razor cartridge having at least one razor blade, and a valve selectively actuatable by movement of the razor cartridge between a first position and a second position. In the first position the valve permits passage of a shaving aid material from the reservoir, and in the second position the valve substantially prevents the passage of the shaving aid material from the reservoir.

7 Claims, 3 Drawing Sheets

U.S. PATENT DOCUMENTS

| | | |
|---|---|---|
| 5,092,041 A | 3/1992 | Podolsky .................. 30/41 |
| 5,103,560 A | 4/1992 | Podolsky .................. 30/41 |
| 5,168,628 A | 12/1992 | Mock et al. ............... 30/41 |
| 5,234,140 A | 8/1993 | Demarest et al. ........ 222/394 |
| 5,384,961 A | 1/1995 | Gregory ................... 30/41 |
| 5,564,190 A | 10/1996 | Fleetwood ............... 30/41 |
| 5,673,485 A | 10/1997 | Hill ...................... 30/41.5 |
| 5,701,674 A | 12/1997 | Mitchell ................. 30/41 |
| 5,761,813 A | 6/1998 | Frick et al. .............. 30/41 |
| 5,855,066 A | 1/1999 | Manger ................... 30/41 |
| 5,983,500 A | 11/1999 | da Silva .................. 30/41 |
| 2002/0023351 A1 | 2/2002 | Simms |
| 2002/0029478 A1 | 3/2002 | Haws et al. |

FOREIGN PATENT DOCUMENTS

| | | |
|---|---|---|
| FR | 2 634 154 A | 1/1990 |
| GB | 2 246 314 A | 1/1992 |
| JP | 10-165668 | 6/1998 |
| JP | 2003210874 | 7/2003 |
| WO | WO 00/10780 | 3/2000 |
| WO | WO 00/47374 | 8/2000 |
| WO | WO 02 / 32253 A1 | 4/2002 |

* cited by examiner

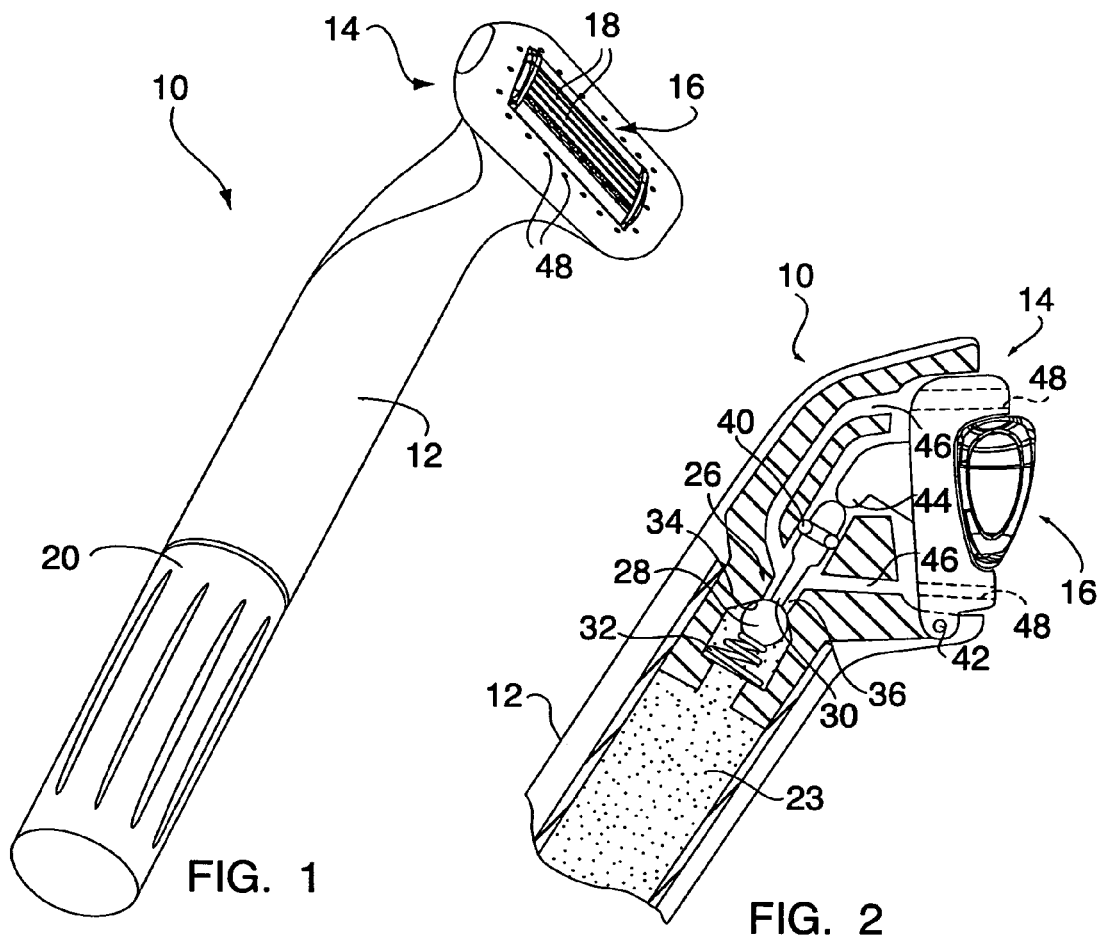
FIG. 1
FIG. 2
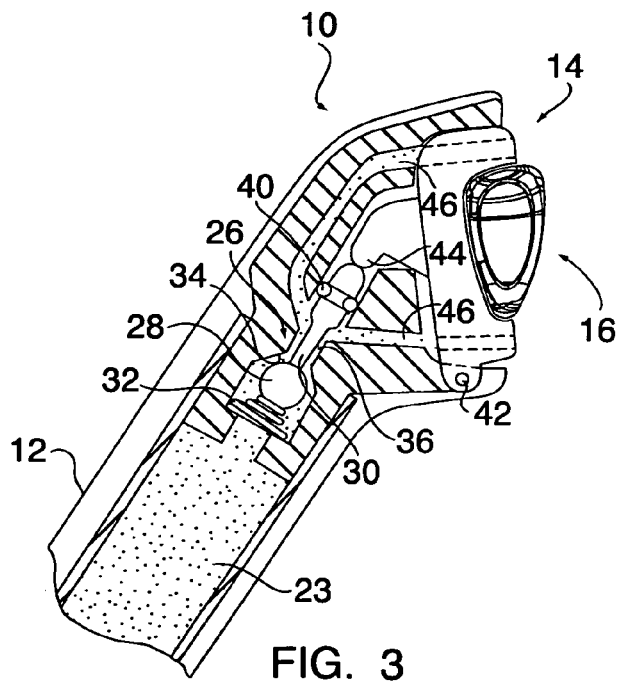
FIG. 3

SHAVING APPARATUS WITH PIVOT-ACTUATED VALVE FOR DELIVERY OF SHAVING AID MATERIAL

BACKGROUND OF THE INVENTION

1. Technical Field

This disclosure relates generally to shaving apparatuses, and, more particularly, to shaving apparatuses having pivot-actuated valves through which shaving aid material can be delivered.

2. Background Information

The process of removing hair from a skin surface typically includes the application of a shaving aid material to the skin surface and the separate step of shaving the hair from the skin surface using a safety razor. Safety razors typically include a disposable razor cartridge mounted in a reusable handle or a handle and cartridge combined into a unitary disposable unit. Most razor cartridges include a frame, at least one razor blade, and a member that includes an additional shaving aid material attached to the frame. The additional shaving aid material typically includes at least one suitable agent (e.g., a lubricating agent, a drag-reducing agent, a depilatory agent, etc.) that enhances the shaving process.

Shaving aid materials applied in preparation for shaving are generally soap-based compositions that are lathered and applied to the skin surfaces. The compositions may be pre-lathered and applied as creams, or they may be in bar form and rubbingly applied to the skin surfaces by the person shaving. For applications of either creams or bars, the application of the shaving aid and the actual shaving of hair from the skin surface are executed in separate steps.

The commercial success of a razor assembly depends upon the ease with which a shaving process using the razor assembly can be executed. In particular, the application of the shaving aid material and the actual shaving of the hair in separately executed steps oftentimes adversely affects the overall efficiency of the shaving process. What is needed, therefore, is an apparatus capable of delivering the shaving aid material and executing a shaving operation in a single step.

DISCLOSURE OF THE INVENTION

According to the present invention, a shaving apparatus includes a reservoir for storing a shaving aid material, a razor cartridge having at least one razor blade, and a valve selectively actuatable by movement of the razor cartridge between a first position and a second position. In the first position the valve permits passage of a shaving aid material from the reservoir, and in the second position the valve substantially prevents the passage of the shaving aid material from the reservoir. In one embodiment, the valve includes a spring-loaded plug element and an orifice, each being cooperable to permit or prevent the passage of the shaving aid material. In another embodiment, the valve comprises first and second plates engagable with each other such that during the engagement of the plates, the passage of the shaving material from the reservoir is prevented.

The present invention further includes a valve for a shaving apparatus. The valve includes a plug element cooperably connected to a razor cartridge and an orifice in which the plug element is received. In such a valve, the razor cartridge is movable between first and second positions to permit or prevent the passage of shaving aid material from the reservoir. In one embodiment, the plug element is a spring-loaded ball disposed on a stem, and in a second embodiment the plug element is a first plate engagable by a second plate, the plates being capable of being biased together by a spring.

The shaving apparatus having the valve selectively actuatable by movement of the razor cartridge between first and second positions to effect the passage of the shaving aid material has several advantages over similar apparatuses of the related art. First, such an apparatus allows for the delivery of the shaving aid material to the surface to be shaved during the shaving operation, thereby avoiding the need for applying the shaving aid material in a separate step. Such an application allows a person to reduce the amount of time spent shaving. Second, because the shaving aid material is incorporated directly into the structure of the razor handle, the need for purchasing razors and shaving aid material separately is avoided. Third, the amount of wasted shaving material is reduced. In particular, by applying shaving aid material directly from the shaving apparatus to the surface to be shaved, the large quantities of unused shaving cream that remain on the hand of the person shaving at the end of the shaving operation are eliminated. These and other advantages will be evident from the Detailed Description presented below.

BRIEF DESCRIPTION OF THE DRAWINGS

FIG. 1 is a perspective view of a shaving apparatus from which a shaving aid material is delivered in response to the engagement of the apparatus with a hirsute surface.

FIG. 2 is a cross-sectional view of a shaving apparatus showing a valve that is actuatable in response to the pivoting of a razor cartridge.

FIG. 3 is a cross sectional view of a shaving apparatus showing an alternate embodiment of a valve that is actuatable in response to the pivoting of the razor cartridge.

DETAILED DESCRIPTION

Figure 4:
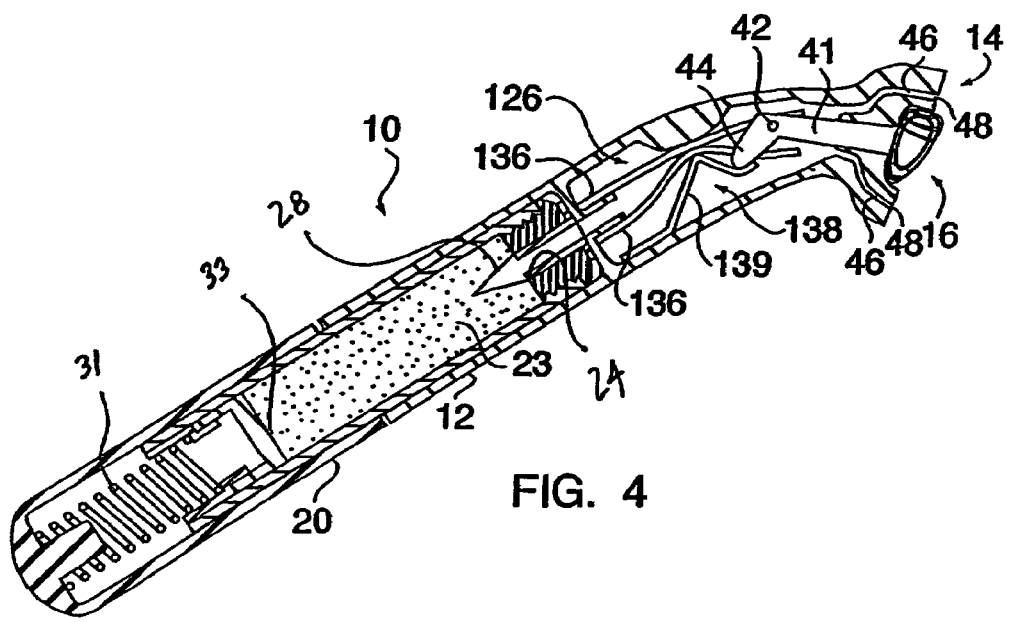
FIG. 4 is a plan view of a head assembly of a shaving apparatus showing ports through which shaving aid material is delivered in response to the pivoting of a razor cartridge.

Disclosed herein are exemplary embodiments of articles for shaving and, more particularly, articles for the automatic delivery of shaving aid materials from shaving aid apparatuses. Preferably, the shaving apparatus as recited herein is suited for wet shaving applications, e.g., applications in which the surface to be shaved is wetted prior to its receiving a shaving aid preparation (e.g., shaving cream, gel, or the like) and its engagement by a razor blade.

Referring to FIG. 1, a shaving apparatus from which a shaving aid material is delivered in response to the engagement of the apparatus with a hirsute surface is shown generally at 10. The shaving apparatus 10 includes a handle 12, a razor cartridge 16 disposed in a head assembly 14 coupled or integrally formed with the handle 12, at least one razor blade 18 operably disposed in the razor cartridge 16, and a valve selectively actuatable by movement of the razor cartridge 16 between first and second positions to permit or prevent the delivery of shaving aid material from the shaving apparatus 10.

The structure of the handle 12 preferably defines a reservoir in which the shaving aid material is stored. In one exemplary embodiment of the shaving apparatus 10, the handle 12 includes at least one wall formed to define a tubular structure that is conducive to being grasped by a person executing a shaving operation. The handle 12 may be configured to have an ergonomic design that provides comfort during the shaving operation. The end of the handle 12 distal from the end at which the razor cartridge 16 is mounted may include an opening that provides access to the reservoir. The opening is preferably coverable by a cap 20, which may be disposed over the opening and retained on the handle 12 by any one or a combination of various mechanisms including, but not limited to, frictional engagement of the handle 12 and the cap 20, the engagement of a ridge formed in either the cap 20 or the outer surface of the handle 12 with a groove formed in the other of the outer surface of the handle 12 or the cap 20, a thread means, or the like. Alternatively, the handle may be closed to prevent access to the reservoir when, for example, the reservoir contains only enough shaving aid material such that upon depletion of the reservoir the shaving apparatus 10 is intended to be disposed.

The shaving apparatus 10 in which one exemplary embodiment of the valve can be seen is shown with reference to FIG. 2. The valve, which is shown at 26, includes a plug element that selectively permits or prevents the flow of shaving aid material through an orifice. As shown, the plug element is a ball 28 disposed on a stem 30. It should be understood by those of skill in the art, however, that other configurations and geometries including disks, plates, and the like, may be utilized as plug elements. The ball 28 is biased by a spring 32 in the direction of flow of the shaving aid material from the reservoir 23 and is cooperable with a seat 34 through which the orifice is disposed.

The stem 30 is positioned in a manifold 36, through which fluid communication may be maintained between the reservoir 23 and conduits 46 that extend to a surface adjacent to the razor cartridge 16 to supply shaving aid material to the surface to be shaved. The end of the stem 30 distal from the ball 28 is engagable by a protrusion 44 on the razor cartridge 16, which is articulatively coupled to the handle 12 at a pivot point 42 such that the razor cartridge 16 is movable within the opening of the head assembly 14 in response to the engagement of the razor cartridge 16 with the surface to be shaved. A seal member 40 (e.g., the O-ring shown in FIGS. 2 and 3, or packing, lip seal, etc.) is disposed adjacent the stem 30 to prevent the escape of shaving aid material around the stem 30. The seal member 40 may be integral with the stem 30 or independent of the stem 30.

The operation of the valve 26 is effected through the cooperation of the stem 30 and the razor cartridge 16. Upon movement of the razor cartridge 16 from a first position to a second position, the protrusion 44 causes the stem 30 to translate in the manifold 36 to selectively seat and unseat the ball 28, thereby causing the intermittent opening and closing of the valve 26. Upon the opening of the valve 26 (unseating of the ball 28), shaving aid material is transferred through the orifice defined by the seat 34 to the manifold 36 and into the conduits 46. The shaving aid material is dispensed from the conduits 46 to the razor cartridge 16, which is positioned on the surface to be shaved.

The driving force for the transfer of the shaving aid material from the reservoir 23 is a pressure differential. The pressure differential may be supplied by pressurization of the shaving aid material using an inert gas, a pre-packaged insertable vessel from which the shaving aid preparation is dispensed under a spring-bias mechanism (shown with reference to FIG. 3), or the like.

Referring now to FIG. 4, another exemplary embodiment of a valve for the shaving apparatus 10 is shown at 126. The valve 126 of shaving apparatus 10 includes a plug element and an orifice in which the plug element is defined by two or more plates 136. At least one of the plates 136 is selectively engagable with at least one of the other plates 136 to open or close the valve 126 to prevent or permit flow through the orifice formed by the plates in the open position. The plates 136 are arranged such that a flow of shaving aid material from the reservoir 23 is received therebetween. The engagement of one of the plates 136 with the other plate 136 is effected in response to the biasing of a spring 138, which results from the movement of the razor cartridge 16 within the head assembly 14. Preferable, the spring is a leaf spring. Furthermore, at least one of the plates 136 is preferably flexible to facilitate the engagement of the plates in response to the biasing of the spring 138.

The razor cartridge 16 is mounted at or near one end of a pivotal arm 41 such that the razor cartridge 16 is movable within the opening of the head assembly 14 in response to the engagement of the razor cartridge 16 with the surface to be shaved. The arm 41 includes a protrusion 44 that engages the gate 138. Upon pivotal movement of the arm 41 (and the attached protrusion 44), the gate 138 is deflected and drawn out of engagement with the tube 136, thereby causing the valve 126 to open and allow the shaving aid material to flow from the reservoir 23.

Conduits 46 are disposed within the handle 12 and the head assembly 14 to provide for the transfer of the shaving aid material from the valve 126 (upon opening of the valve 126) to the surface at which the razor cartridge 16 engages the surface to be shaved. The conduits 46 preferably provide communication between the outlet of the valve 126 and ports 48 adjacent to the opening in the head assembly 14 in which the razor cartridge 16 moves. In a preferred embodiment, shaving aid material flows into the conduits 46 as close to the outlet of the valve 26 as possible, thereby avoiding or at least minimizing contact of the protrusion 44 and the pivot point 42 with the shaving aid material.

As can be seen, the reservoir 23 may be configured to receive the shaving aid material in a pre-packaged form (eg., in a foil- or plastic vessel manually insertable into the handle 12). In such an embodiment, an outlet 24 of the reservoir 23 preferably comprises a spike 28 that punctures the foil- or plastic vessel containing the shaving aid material upon insertion of the vessel into the handle 12. The cap 20 preferably includes a piston, 33 or a plate biased by a spring 31 that provides the pressure for transferring the shaving aid material through the outlet 24 to the valve 126.

Figure 5:
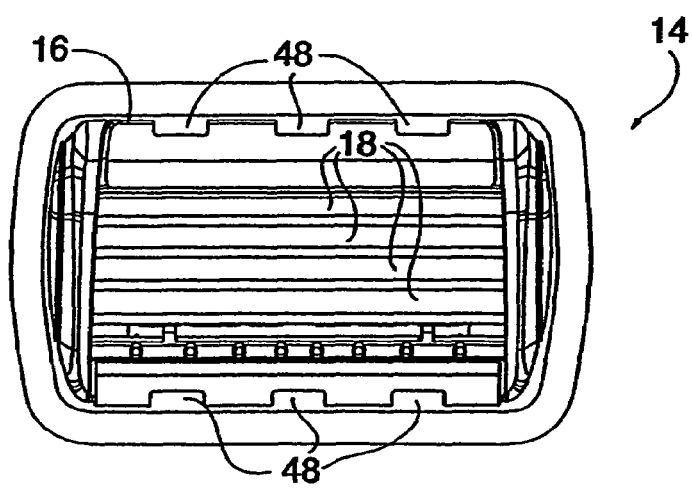
FIG. 5 is a front view of a razor cartridge of the present invention.

Referring now to FIG. 5, the positioning of ports 48 at the surface of the head assembly 14 into which the razor cartridge 16 is pivotally mounted is shown. Although only six ports 48 are illustrated, and although the ports 48 are illustrated as being disposed on opposing sides of the razor cartridge 16, it should be understood that any number of ports 48 may be disposed at any position around the razor cartridge 16. Furthermore, it should be understood that the illustrated configuration of ports 48 may be utilized with the embodiments of the valves shown in FIG. 2 or FIG. 3 as well as any other valve.

Figure 6:
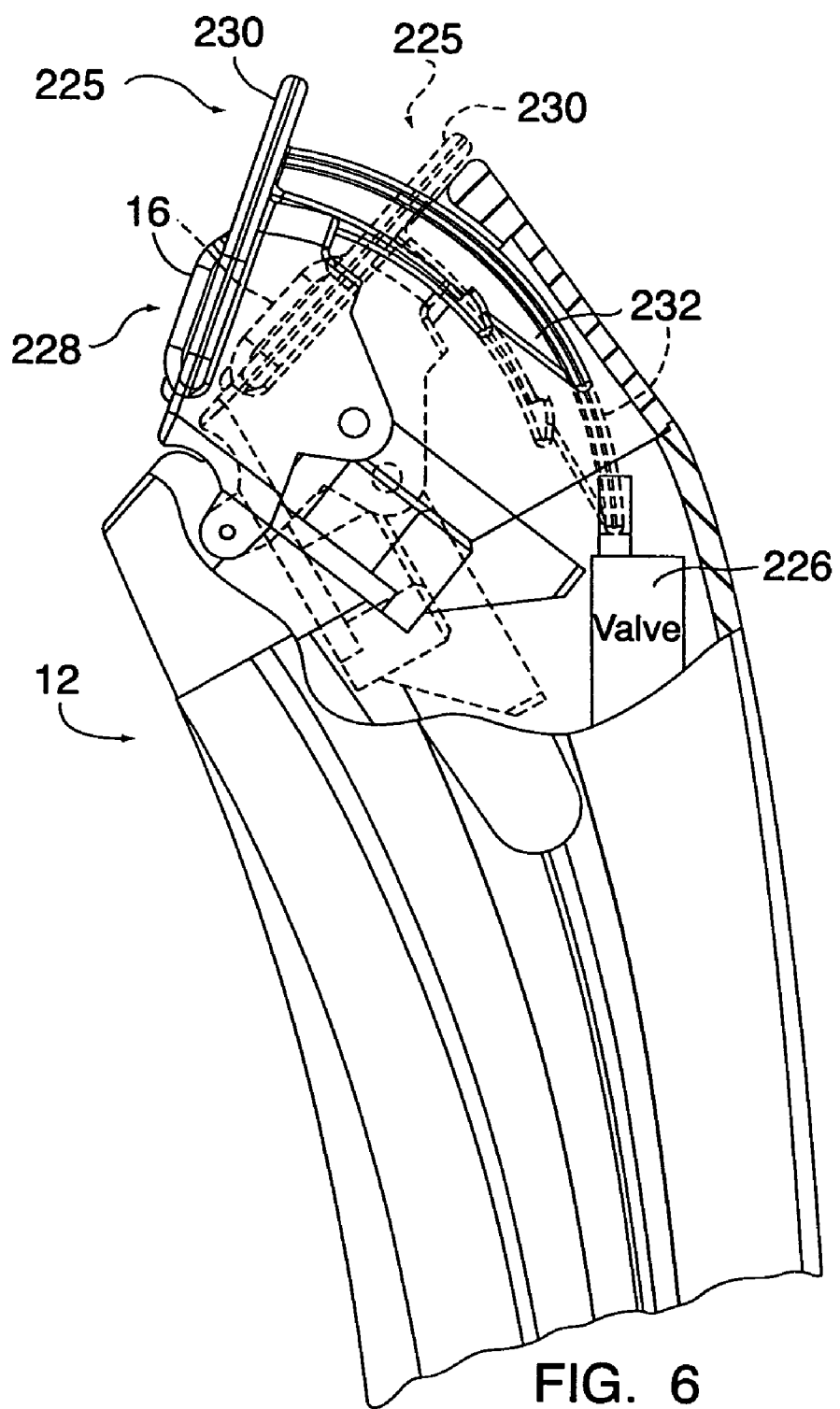
FIG. 6 is a side view of one embodiment of the present invention, depicting motion of a razor cartridge between a first position and a second position.

Referring now to FIG. 6, another exemplary embodiment of a valve for the shaving apparatus is shown at 226. The valve 226 is actuatable by the pivotal movement of the razor cartridge 16 within the handle 12. As pressure is exerted on a face 230 of a hinged member 225 on which razor blades 228 are mounted, a curved member 232 is urged within the handle 12 to engage the valve 226, thereby releasing shaving aid material to the face of the razor cartridge.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A shaving apparatus, comprising:
   a reservoir for storing a shaving aid material;
   a razor cartridge having at least one razor blade; and
   a valve comprising a spring-loaded plug element and an orifice to receive the spring-loaded plug element is selectively actuable by movement of the razor cartridge between a first position and a second position;
   wherein in the first position the valve permits passage of shaving aid material from the reservoir, and in the second position the valve substantially prevents passage of shaving aid material from the reservoir; and
   wherein the spring-loaded plug element is a ball.

2. A shaving apparatus, comprising:
   a reservoir for storing a shaving aid material;
   a razor cartridge having at least one razor blade; and
   a valve selectively actuable by movement of the razor cartridge between a first position and a second position;
   wherein in the first position the valve permits passage of shaving aid material from the reservoir, and in the second position the valve substantially prevents passage of shaving aid material from the reservoir;
   wherein the valve comprises a first plate and a second plate disposed such that a surface of the second plate is engagable with a surface of the first plate to prevent the flow of the shaving aid material from the reservoir.

3. The shaving apparatus of claim 2, further comprising a spring configured to bias the surface of the second plate against the surface of the first plate.

4. The shaving apparatus of claim 3, wherein said spring is a leaf spring.

5. A valve for a shaving apparatus, comprising:
   a plug element cooperably connected to a razor cartridge; and
   an orifice in which the plug element is received, the orifice adapted to be in fluid communication with a reservoir that forms a portion of the shaving apparatus;
   wherein the razor cartridge is movable between a first position and a second position such that the plug element is adapted to permit passage of a shaving aid material from the reservoir when the razor cartridge is in the first position and is adapted to prevent passage of the shaving aid material from the reservoir when the razor cartridge is in the second position; and
   wherein the plug element is a spring-loaded ball.

6. The valve of claim 5, wherein the ball is disposed on a stem.

7. The valve of claim 6, wherein the stem is operably connected to the razor cartridge.

* * * * *